Aug. 8, 1961     S. GREENE     2,995,115

HIGH-PRESSURE PRECISION FLUID-OPERATED DEVICE

Filed Sept. 21, 1959     2 Sheets-Sheet 1

High-Pressure Precision Fluid-Operated Device

S. Greene — Aug. 8, 1961 — 2,995,115
Filed Sept. 21, 1959 — 2 Sheets-Sheet 2

United States Patent Office 2,995,115
Patented Aug. 8, 1961

2,995,115
HIGH-PRESSURE PRECISION FLUID-OPERATED DEVICE
Sanford Greene, 223 Duck Pond Drive S., Wantagh, N.Y.
Filed Sept. 21, 1959, Ser. No. 841,361
4 Claims. (Cl. 121—38)

This invention relates to high-pressure precision fluid-operated devices and, while it is of general application, it is particularly suitable for actuating a microswitch included in an automatic fluid-pressure regulating system and will be specifically described in such an environment.

Heretofore fluid-operated devices have generally utilized the principle of a deflecting seal or moving piston restrained by a spring, or the like, which opposes the fluid pressure applied to the seal or piston. The spring force is adjusted to a value at which it is desired that the device operate and, as the fluid pressure increases beyond such value, it overcomes the spring pressure and moves the seal or piston to actuate an output element connected thereto. When the fluid pressure drops below the operating value, the spring forces back the piston or seal to de-actuate the device.

In devices of the type described, the difference between the pressures at which the device is actuated and de-actuated is termed the "dead band" and is a function both of the spring rate or constant and the sealing friction of the diaphragm or piston. It is well known that spring rates tend to vary with temperature, aging, and the like, undesirably affecting the dead band of such a device. Moreover, since the full system pressure appears across the piston or diaphragm seal, the seal friction becomes quite substantial for system pressures upwards of 1000 p.s.i., resulting in a relatively wide dead band. Moreover, at such high pressures if it is desired to minimize the dead band, for example, by minimizing the amount of spring deflection between the actuated and de-actuated positions, a very large bias spring is required, resulting in a heavy, bulky, and costly device.

Moreover, in fluid-operated devices of the type described, the dead band depends also upon the amount of movement required by the actuated element, since such movement is related to the movement of the piston, or the like, and thus to the amount of deflection of the bias spring. Because of this characteristic, it becomes difficult, if not impossible, to provide a standardized or packaged fluid-operated unit for actuating devices requiring movement through different distances.

It is an object of the present invention, therefore, to provide a new and improved fluid-operated device which obviates one or more of the above-mentioned disadvantages of prior devices.

It is another object of the invention to provide a new and improved fluid-operated device having one or more of the following desirable operating characteristics: minimum sizes and weight, even for the highest operating pressures; compensation for seal friction; dead band having a range of adjustment from a minimum to any desired value; operation independent of the rate of the biasing spring of the piston, diaphragm, or the like; and a movement of the actuated element independent of the spring rate or equivalent.

In accordance with the invention, there is provided a high-pressure precision fluid-actuated device comprising a cylinder, a housing enclosing the cylinder and having a restricted aperture, a two-part main piston freely floating in the cylinder and forming a fluid chamber on either side thereof, an actuating element disposed between and engaged by the parts of the piston and extending through the aperture in the housing and restricted in its movement thereby, a fluid inlet port, and a fluid connection from the inlet port to one of the chambers including a valve. The device also includes an auxiliary cylinder including a spring-biased auxiliary piston normally retaining the valve in open position, a fluid connection from such auxiliary cylinder to the inlet port and including such valve, the auxiliary piston being connected to release said valve to closed position when the inlet pressure reaches a substantially predetermined value, thereby trapping the fluid in one of the cylinder chambers, and means for normally establishing a fluid connection from the inlet port to the other of the cylinder chambers, whereby the main piston is actuated when the pressure at the inlet port exceeds such predetermined value.

For a better understanding of the present invention, together with other and further objects thereof, reference is had to the following description taken in connection with the accompanying drawings, while its scope will be pointed out in the appended claims.

Referring now to the drawings:

FIG. 2 is a longitudinal sectional view of a fluid-operated device embodying a preferred form of the invention; while

Figure 1:
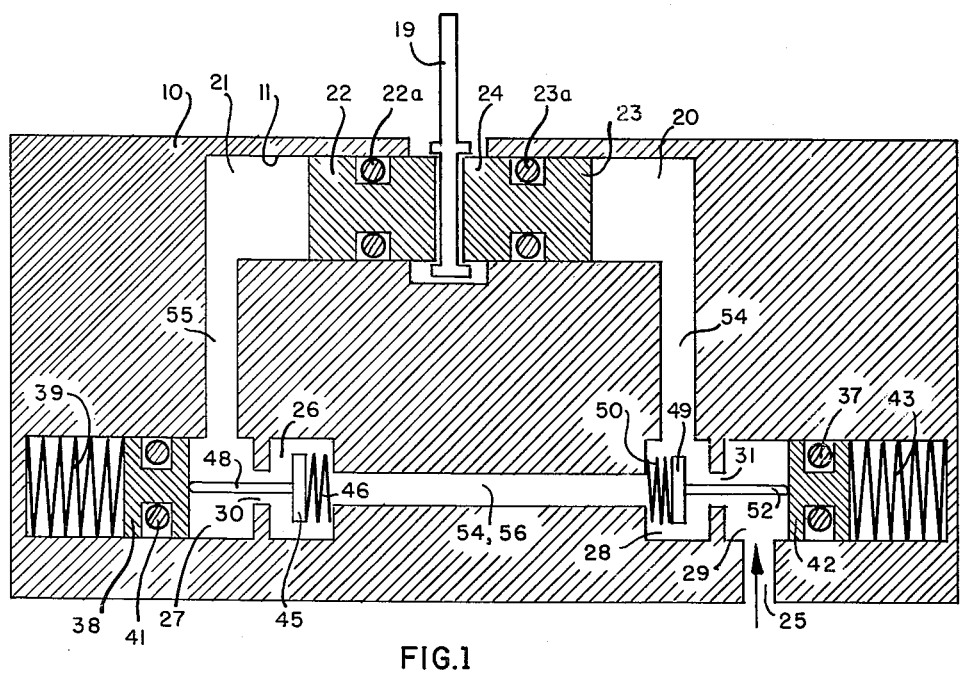
FIG. 1 is a schematic representation of a fluid-operated device embodying the present invention.
Figure 2:
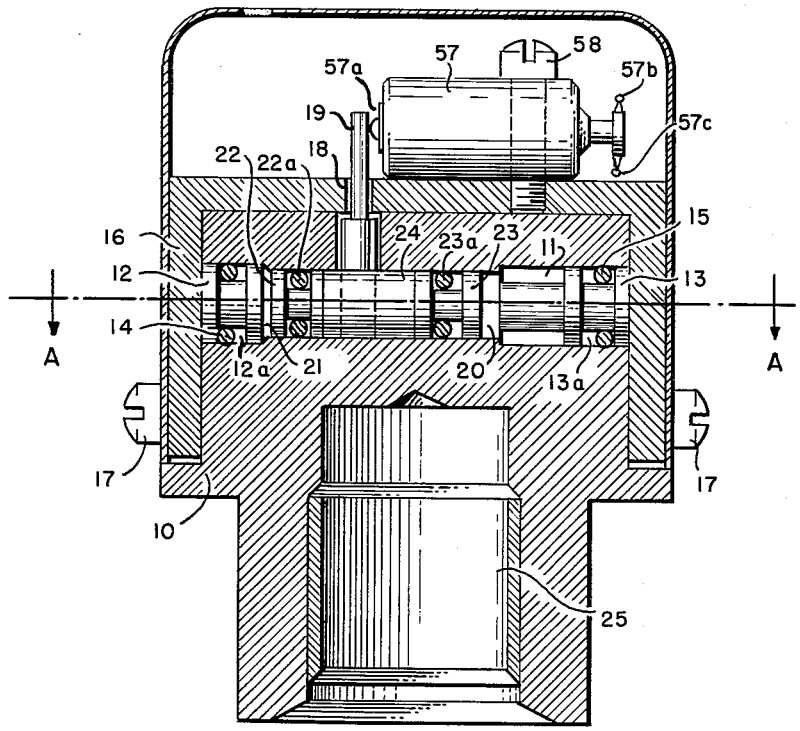
Figure 3:
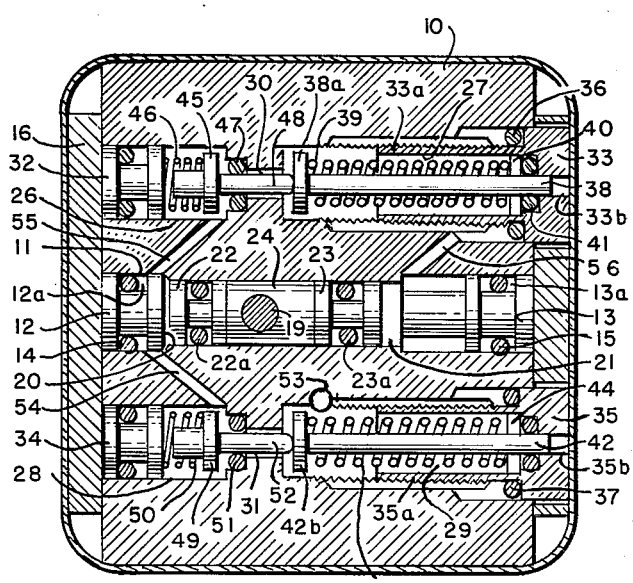
FIG. 3 is a cross-sectional view along the lines A—A of FIG. 2.

Reference will now be made to FIGS. 1, 2, and 3 of the drawings, in which corresponding elements are identified by the same reference numerals, since the nature of the device may be easier to follow from the schematic representation of FIG. 1. However, in FIG. 1 the corresponding elements are reversed right to left with respect to FIGS. 2 and 3. The high-pressure precision fluid-actuated device represented in FIGS. 1-3, inclusive, includes a body block 10 of rectangular cross section including a central bore 11 having a sealing member at each end thereof forming a main cylinder. As shown in FIG. 3, these sealing members may be in the form of annular plugs 12, 13 having formed therein annular grooves 12a, 13a, in which are disposed sealing rings in the form of O rings 14, 15, respectively. The device also includes a housing 16 enclosing the cylinder block 10 and comprising essentially a U-shaped stirrup. The housing may be maintained in place by means of cap screws 17, 17, or the like, engaging the block 10. In the upper arm of the housing 16 is a restricted aperture 18 through which projects an actuating element 19, described hereinafter.

Disposed within the main bore or cylinder 11 is a main piston freely floating in the cylinder and forming a fluid chamber on either side thereof, these chambers being represented at 20 and 21. The main piston may be a unitary structure or, as shown, may be made up of piston elements 22 and 23 having circumferential grooves in which are disposed sealing rings 22a, 23a, respectively. The actuating element 19 is secured to a slide 24 loosely fitting in the cylinder 11 and disposed between and engaged by the parts 22 and 23 of the main piston and driven thereby. The actuating element 19 extends through the aperture 18 and is restricted thereby in its longitudinal movement.

The fluid-operated device of the invention also includes a fluid inlet port 25 in the block 10 and first and second pairs of opposed bores 26, 27 and 28, 29. Each of these pairs of bores have restricted fluid passages or connections therebetween, such as the passages 30 and 31, respectively. The bores 26, 27, 28, and 29 individually have sealing members 32, 33, 34, and 35, respectively, at their outer ends forming auxiliary cylinders in the bores 27 and 29 and valve chambers in the bores 26 and 28. The sealing members 32 and 34 may be similar to the sealing members 12 and 13, respectively, while the sealing members 33 and 35 have elongated tubular extensions 33a and 35a threaded in the bores 27 and 29, respectively, and provided with sealing O rings 36 and 37, respectively. The housing 16 serves to retain the sealing members 12, 13, 32, and 34 in place. As shown in FIG. 3, preferably the axes of all of the bores in the block 10 lie substantially in a common plane.

The fluid-operated device of the invention also includes an auxiliary spring-biased piston in each of the auxiliary cylinders or bores 27 and 29. For example, the piston 38 in the cylinder 27 is disposed to slide in a small bore 33b in element 33 and is provided with an enlarged head 38a against which acts a biasing spring 39 which is disposed in the tubular extension 33a and the other end of which engages an annular ring 40 resting against a shoulder in the tubular extension 33a of element 30. The piston 38 is sealed to ambient pressure by means of an O ring 41. There is disposed in the auxiliary cylinder 29 a similar piston 42 disposed in a small bore 35b of element 35 having an enlarged head 42b against which acts the auxiliary biasing spring 43, disposed in tubular extension 35a and acting against an annular ring 44 engaging a shoulder in the inner bore of the tubular extension 35a.

The fluid-operated device of the invention also includes a poppet valve disposed in each of the valve chambers or bores 26, 28 to close its associated restricted fluid passage or connection and connected to be actuated by the auxiliary piston in its associated bore. For example, in the chamber 26 is disposed a poppet valve 45 biased by a light spring 46 into engagement with a sealing O ring 47 disposed in an enlarged portion of the fluid passage 30. Connected to the valve 45 is a valve stem or push rod 48 extending through the passage 30 into the auxiliary cylinder 27 to be actuated by the piston 38. Similarly, in the valve chamber 28 is disposed a poppet valve 49 biased by a light spring 50 into engagement with a sealing O ring 51 in an enlargement of the fluid passage 31 and having a valve stem or push rod 52 extending through the passage 31 into the auxiliary cylinder 29 to be actuated by the piston 42.

The fluid-operated device of the invention also includes a fluid connection from the inlet port 25 to one of the main cylinder chambers, specifically, the chamber 21, this fluid connection comprising a fluid passage 53 from the inlet port 25 to the auxiliary cylinder 29, the fluid connection 31 from the auxiliary cylinder 29 to the valve chamber 28, a fluid passage 54 from the valve chamber 28 to the main cylinder chamber 20, a fluid passage 55 from chamber 20 to valve chamber 26, fluid passage 30 from valve chamber 26 to auxiliary cylinder 27, and a fluid passage 56 from auxiliary cylinder 27 to the main cylinder chamber 21. It will be noted that this fluid connection includes the poppet valve 45 in the valve chamber 26. The spring constant of the spring 39 biasing the auxiliary piston 38 is selected so that this piston permits the poppet valve 45 to close under the influence of its biasing spring 46 when the inlet pressure reaches a substantially predetermined value. The spring constant of the spring 43 of auxiliary piston 42 is selected so that this piston opens the poppet valve 49 when the inlet pressure drops below such predetermined value by a desired amount.

The fluid-operated device further includes means for normally establishing a fluid connection from the inlet port 25 to the other of the main cylinder chambers 20, this means being in common to the initial portion of the fluid passage to the chamber 21, namely, the fluid passages 53 and 31, valve chamber 28, and the fluid passage 54.

The fluid-operated device of the invention may actuate any desired control device. By way of example, there is shown a micro-switch 57 disposed on the top of housing 16 and secured thereto by cap screw 58. Since the switch 57, per se, forms no part of the present invention, it is shown schematically and includes an input actuator 57a and electrical output terminals 57b, 57c.

Considering now the operation of the fluid-operated device described, the actuation of the switch 57 is determined by adjustment of the spring 39 of the auxiliary piston 38 by means of the adjustable sealing member 33. The friction of piston 38 is involved in determining the actuation pressure but is a constant force that can be compensated by the setting of spring 39. System fluid pressure is applied through inlet port 25 and by way of conduit 53 to auxiliary cylinder 29 and thence through fluid connection 31 past poppet valve 49 and fluid connection 54 to the main cylinder chamber 20. Simultaneously, the same system pressure flows thence through fluid passage 55, valve chamber 26, and fluid connection 30, auxiliary cylinder 27, and fluid passage 56 to the other main cylinder chamber 21. Hence, the fluid pressures in the main cylinder chambers 20 and 21 normally will be equal and no movement of the main pistons 22 and 23 and the actuated slide 24 occurs.

When the pressure at the fluid inlet 25 increases to substantially a predetermined actuation value, this fluid pressure will be transmitted, through the path just described, to the auxiliary cylinder 27 and will build up in that cylinder to such actuation value. This fluid pressure acts on the head 38a of piston 38, but the effective area of this piston is the difference in the areas of the front and rear faces, that is, the area of the rod-like piston 38 itself. The piston 38 will then be moved against its spring 39, permitting the light spring 46 to seat poppet valve 45, trapping the fluid in the auxiliary cylinder 27 and the main cylinder chamber 21 and sealing off these spaces from further increases in system pressure. When the system pressure then increases slightly above the predetermined value, the pressure in main cylinder chamber 20 will be greater than that in chamber 21, causing pistons 22, 23 to move to the right (FIGS. 2 and 3) toward chamber 21 and driving the slide 24 and the actuating element 19 with them, thus actuating the micro-switch 57. Further increases in system pressure will not damage the sensitive micro-switch 57 because the movement of the actuating element 19 is mechanically limited by the aperture 18 in the housing 16. Obviously, the size of the aperture 18 will be sufficient to permit proper actuation of the element 57a of the switch 57. The movement of the main pistons 22, 23 to the right will expel a limited amount of fluid from the main cylinder chamber 21 into the auxiliary cylinder 27, piston 38 yielding slightly for this purpose.

When the fluid pressure at the inlet port 25 decreases, the poppet valve 49 will maintain all the fluid trapped behind it under the highest system pressure which obtained prior to its closing. When this fluid pressure drops to the point corresponding to the setting of the biasing spring 43 of piston 42, the piston will unseat the poppet valve 49, permitting the fluid pressure in the main cylinder chamber 20 to equalize with that in the inlet port 25. A further decrease in system pressure by a finite amount will result in the high-pressure fluid trapped in the main cylinder chamber 21 driving the main piston 22, 23 to the left (FIGS. 2 and 3) to its original position, at the same time driving the slide 24 and the actuating element 19 away from the element 57a of switch 57 to de-actuate the switch. During this de-actuating operation, premature bleeding of the higher pressure fluid from the chamber 27 through passage 30 is prevented by making the light force of the spring 46 acting on valve 45 slightly greater than the frictional force of the main pistons 22, 23 so that these pistons will be actuated before the valve 45 opens.

Thus, it will be noted that the main actuating piston 22, 23 is full-floating in the main cylinder or bore 11 and that its movement is determined solely by the fluid pressures obtaining in the main cylinder chambers 20 and 21 rather than by the movement of a biasing and actuating spring. Because of this fact also, the amount of required movement of the actuating element 19 is independent of the spring rate or constant of any of the biasing springs of the device. Furthermore, the differential pressure acting across the main piston 22, 23 is only the extremely small amount required to overcome the small sealing friction of the piston and its sealing rings 22a, 23a so that this sealing friction may be an absolute minimum and the dead band of the device may also be reduced to an absolute minimum.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A high-pressure precision fluid-actuated device comprising: a cylinder; a housing enclosing said cylinder and having a restricted aperture; a two-part main piston freely floating in said cylinder and forming a fluid chamber on either side thereof; an actuating element disposed between and engaged by the parts of said piston and extending through said aperture and restricted in its movement thereby; a fluid inlet port; a fluid connection from said inlet port to one of said chambers including a valve; an auxiliary cylinder including a spring-biased auxiliary piston normally retaining said valve in open position; a fluid connection from said auxiliary cylinder to said port and including said valve, said auxiliary piston being connected to release said valve to closed position when the inlet pressure reaches a substantially predetermined value, thereby trapping the fluid in said one of said chambers; and means for normally establishing a fluid connection from said inlet port to the other of said chambers, whereby said main piston is actuated when the pressure at said inlet exceeds said predetermined value.

2. A high-pressure precision fluid-actuated device comprising: a cylinder; a main piston freely floating in said cylinder and forming a fluid chamber on either side thereof; a fluid inlet port; a fluid connection from said inlet port to one of said chambers including a first valve; a fluid connection from said inlet port to the other of said chambers including a second valve; a first auxiliary cylinder including a first spring-biased auxiliary piston normally retaining said first valve in open position; a fluid connection from said auxiliary cylinder to said port and including said first valve, said auxiliary piston being connected to release said first valve to closed position when the inlet pressure reaches a substantially predetermined value, thereby trapping the fluid in said one of said chambers; a second auxiliary cylinder including a spring-biased second auxiliary piston; a fluid connection from said second auxiliary cylinder to said port; said second auxiliary piston being connected to close said second valve when the inlet pressure exceeds said predetermined value, thereby trapping the fluid in the other of said chambers and maintaining said main piston in its actuated position until the pressure at said inlet drops below the setting of said first auxiliary piston.

3. A high-pressure precision fluid-actuated device comprising: a cylinder; a main piston freely floating in said cylinder and forming a fluid chamber on either side thereof; a fluid inlet port; a fluid connection from said inlet port to one of said chambers including a first valve; a fluid connection from said inlet port to the other of said chambers including a second valve, said second valve being included also in said fluid connection to said one of said chambers; a first auxiliary cylinder including a first spring-biased auxiliary piston normally retaining said first valve in open position; a fluid connection from said auxiliary cylinder to said port and including said first valve, said auxiliary piston being connected to release said first valve to closed position when the inlet pressure reaches a substantially predetermined value, thereby trapping the fluid in said one of said chambers; a second auxiliary cylinder including a spring-biased second auxiliary piston; a fluid connection from said second auxiliary cylinder to said port; said second auxiliary piston being connected to close said second valve when the inlet pressure exceeds said predetermined value, thereby trapping the fluid in the other of said chambers and maintaining said main piston in its actuated position until the pressure at said inlet drops below the setting of said first auxiliary piston.

4. A high-pressure precision fluid-actuated device comprising: a body block of rectangular cross section and including a central bore having a sealing member at each end forming a main cylinder; a main piston freely floating in said main cylinder and forming a fluid chamber on either side thereof; an actuating element having a driving connection to said main piston; first and second pairs of opposed bores, each pair having a restricted fluid connection therebetween and all said opposed bores having sealing members at the outer ends thereof forming an auxiliary cylinder in one bore of each pair and a valve chamber in the other, the axes of all said bores lying substantially in a common plane; an auxiliary spring-biased piston in each of said auxiliary cylinders; a poppet valve disposed in each of said valve chambers to close its associated restricted fluid connection and connected to be actuated by the auxiliary piston in its associated bore; a fluid inlet port in said body block; a first fluid connection from said inlet port to the auxiliary cylinder of said pair of bores; a second fluid connection between said valve chambers; a third fluid connection between the valve chamber of said second pair of bores and one of said fluid chambers of said main cylinder; and a fourth fluid connection between the auxiliary cylinder of said second pair of bores and the other of said fluid chambers of said main cylinder, the bias of said first auxiliary piston being set at a predetermined value, whereby said actuating element is actuated when the fluid pressure at said inlet port exceeds said predetermined value and is de-actuated when said fluid pressure drops below said predetermined pressure.

References Cited in the file of this patent

UNITED STATES PATENTS

| | | |
|---|---|---|
| 2,058,425 | Doyle | Oct. 27, 1936 |
| 2,104,934 | Smith | Jan. 11, 1938 |
| 2,375,410 | Gondek et al. | May 8, 1945 |
| 2,477,247 | Haberland | July 26, 1949 |
| 2,520,893 | Stevenson | Aug. 29, 1950 |
| 2,820,434 | Otto | Jan. 21, 1958 |